(12) United States Patent
Rossi et al.

(10) Patent No.: US 7,649,558 B2
(45) Date of Patent: *Jan. 19, 2010

(54) CHARGE MODE ACTIVE PIXEL SENSOR READ-OUT CIRCUIT

(75) Inventors: Giuseppe Rossi, Pasadena, CA (US); Sandor L. Barna, Pasadena, CA (US)

(73) Assignee: Aptina Imaging Corporation (KY)

( * ) Notice: Subject to any disclaimer, the term of this patent is extended or adjusted under 35 U.S.C. 154(b) by 562 days.

This patent is subject to a terminal disclaimer.

(21) Appl. No.: 11/455,714

(22) Filed: Jun. 20, 2006

(65) Prior Publication Data

US 2006/0278812 A1 Dec. 14, 2006

Related U.S. Application Data

(63) Continuation of application No. 09/901,280, filed on Jul. 9, 2001, now Pat. No. 7,088,394.

(51) Int. Cl.
*H04N 3/14* (2006.01)
*H01L 31/062* (2006.01)
*H01L 27/00* (2006.01)

(52) U.S. Cl. .................. 348/294; 348/308; 257/291; 250/208.1

(58) Field of Classification Search ................. 348/294, 348/302, 308, 315, 316; 250/208.1; 257/291
See application file for complete search history.

(56) References Cited

U.S. PATENT DOCUMENTS

| | | | |
|---|---|---|---|
| 5,134,489 A | 7/1992 | Sauer | |
| 5,148,268 A | 9/1992 | Tandon et al. | |
| 5,160,836 A * | 11/1992 | Miyake | 250/208.1 |
| 5,471,515 A | 11/1995 | Fossum et al. | |
| 5,550,653 A | 8/1996 | TeWinkle et al. | |
| 5,631,704 A | 5/1997 | Dickinson et al. | |
| 5,739,562 A | 4/1998 | Ackland et al. | |
| 5,789,736 A | 8/1998 | Kawahara | |
| 5,812,191 A * | 9/1998 | Orava et al. | 348/308 |
| 5,841,126 A | 11/1998 | Fossum et al. | |
| 5,854,656 A | 12/1998 | Noggle | |
| 6,252,217 B1 | 6/2001 | Pyyhtia | |
| 6,366,320 B1 * | 4/2002 | Nair et al. | 348/308 |
| 6,512,546 B1 * | 1/2003 | Decker et al. | 348/308 |
| 2002/0179820 A1 * | 12/2002 | Stark | 250/208.1 |

OTHER PUBLICATIONS

Mendis et al., "CMOS Active Pixel Image Sensor," IEEE Transactions on Electron Devices, vol. 41, No. 3, Mar. 1994, pp. 452-453.
Mendis et al., "Progress in CMOS Active Pixel Image Sensors," Proceedings of the SPIE vol. 2172, Charge-Coupled Devices and Solid State Optical Sensors IV (1994).

* cited by examiner

*Primary Examiner*—Nhan T Tran
(74) *Attorney, Agent, or Firm*—Dickstein Shapiro LLP

(57) ABSTRACT

An apparatus such as an imager includes groups of sensors each of which includes subgroups of sensors. Subgroup select circuits are coupled to outputs from respective subgroups of sensors, and group select circuits are coupled to outputs from subgroup select circuits associated with respective ones of the groups. A bus is coupled to receive outputs from the group select circuits. A controller can provide control signals to the subgroup select circuits and the group select circuits to selectively enable the respective subgroup select circuits and group select circuits to pass signals from the sensors to the bus one sensor at a time.

22 Claims, 5 Drawing Sheets

CHARGE MODE ACTIVE PIXEL SENSOR READ-OUT CIRCUIT

CROSS-REFERENCE TO RELATED APPLICATIONS

The present application is a continuation of U.S. patent application Ser. No. 09/901,280, filed on Jul. 9, 2001, now U.S. Pat. No. 7,088,394, the disclosure of which is incorporated herein by reference in its entirety.

BACKGROUND

The present invention relates to a charge mode active pixel sensor read-out circuit.

Image sensors can be applied in a wide variety of fields, including machine vision, robotics, guidance and navigation, automotive applications, and consumer products. They can include on-chip circuitry that controls image sensor operation, signal read-out and image processing functions. Image sensors can utilize, for example, active pixel sensor (APS) technology with each active pixel sensor including one or more active transistors. Each pixel sensor element can provide an output value that represents a particular portion of an image. The pixel sensor elements can be arranged as an array. Each element in the array may be read sequentially, one element at a time, by a charge mode read-out circuit.

Parasitic capacitance on a readout bus can detrimentally affect APS charge mode read-out circuit operation. Such detrimental effects may include, for example, increased power requirements, increased noise levels and increased signal settling times with consequential slower system operating speed.

SUMMARY

In general, according to one aspect, an apparatus such as an imager includes groups of sensors each of which includes subgroups of sensors. Subgroup select circuits are coupled to outputs from respective subgroups of sensors, and group select circuits are coupled to outputs from subgroup select circuits associated with respective ones of the groups. A bus is coupled to receive outputs from the group select circuits. A controller can provide control signals to the subgroup select circuits and the group select circuits to selectively enable the respective subgroup select circuits and group select circuits to pass signals from the sensors to the bus one sensor at a time.

According to another aspect, a method includes selectively enabling a group select circuit to electrically couple a charge mode read-out amplifier to a respective set of subgroup select circuits, when the group select circuit is enabled, enabling a pixel output signal to pass sequentially from each subgroup select circuit of the respective set of subgroup select circuits through the group select circuit to the charge mode read-out amplifier, and disabling the group select circuit to electrically isolate the charge mode read-out amplifier from the respective set of subgroup select circuits.

According to yet another aspect, a method includes selectively enabling a supergroup select circuit from a set of supergroup select circuits and a series-connected group select circuit from an associated set of group select circuits to electrically couple a charge mode read-out amplifier to a respective set of subgroup select circuits, when the series-connected group select circuits are so enabled, enabling a pixel output signal to pass sequentially from each subgroup select circuit of the respective set of subgroup select circuits through the series-connected group select circuit and supergroup select circuit to the charge mode read-out amplifier, and disabling the group select circuit to electrically isolate the charge mode read-out amplifier from the respective set of subgroup select circuits.

In some implementations, one or more of the following advantages may be present. The techniques described herein can help reduce parasitic capacitance that is electrically coupled to the input ports of a charge mode read-out amplifier. That can reduce losses in a system and reduce the power required for charge mode amplifier operation. This reduction of power requirements may result in operational cost savings for a system.

A reduction in parasitic capacitance can reduce of the magnitude of noise in signals received at the input terminals of the charge mode read-out amplifier. A reduction in noise may result in improved signal clarity and an improvement in the reliability of interpreting such signals. As parasitic capacitance is reduced, signal settling times and system operating speeds also can be improved.

Additionally, the techniques described herein can be implemented without adversely impacting fixed pattern noise (FPN) in a system. In charge mode systems a charge is typically sent through a readout bus to a charge mode amplifier where it is converted into a voltage signal. The techniques described below can be implemented without adversely affecting the output voltage of the charge mode amplifier.

Other features and advantages will be readily apparent from the following detailed description, the accompanying drawings and the claims.

DETAILED DESCRIPTION

Figure 1:
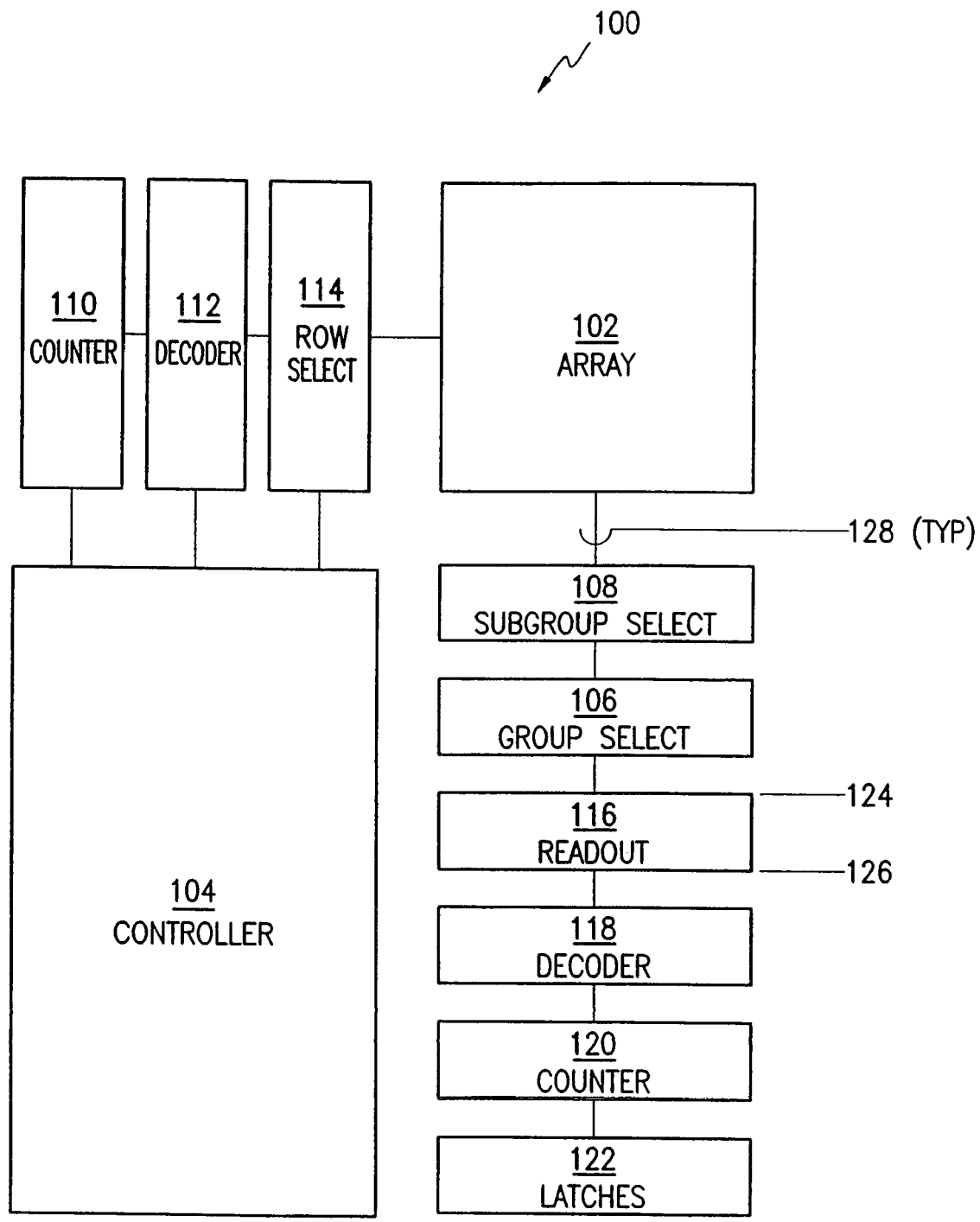
FIG. 1 is a system block diagram.

As shown in FIG. 1, a monolithic integrated imaging circuit 100 includes an array 102 of active pixel sensors and a controller 104. The controller 104 provides timing and control signals that facilitate reading out signals from the pixel sensors and that facilitate various other image processing functions. The dimensions of the array 102 can vary depending on specific imaging requirements for a particular application. For example, array 102 might have dimensions such as 128 active pixel sensors by 128 active pixel sensors or more.

In the illustrated implementation, the various circuit components are coupled to each other by channels 128. Channels 128 can include one or more conductive paths that carry signals between circuit components. A read-out circuit 116 is electrically coupled to the array 102 through a subgroup select module 108 and a group select module 106. The read-out circuit 116 can be a charge mode amplifier or other circuit responsive to a sensed charge. An active pixel sensor of array 102 provides an output signal representative of a portion of an image, and the read-out circuit 116 receives the output signal. The subgroup select module 108, group select module 106 and read-out circuit 108 may include, for example, sample and hold circuitry, switching circuitry, and signal conditioning circuitry. The read-out circuit provides an output signal in response to the signal received from an active pixel sensor of array 102. The output may take the form, for example, of a differential signal on lines 124 and 126, or a non-differential signal outputted to one or more lines.

The imaging circuit 100 also includes counter circuits 110, 120, decoder circuits 112, 118 and other circuitry to support imaging circuit 100 operations. Such circuitry may include for example, row select circuit module 114, latches 122 and additional levels of select circuitry (not shown).

Figure 2:
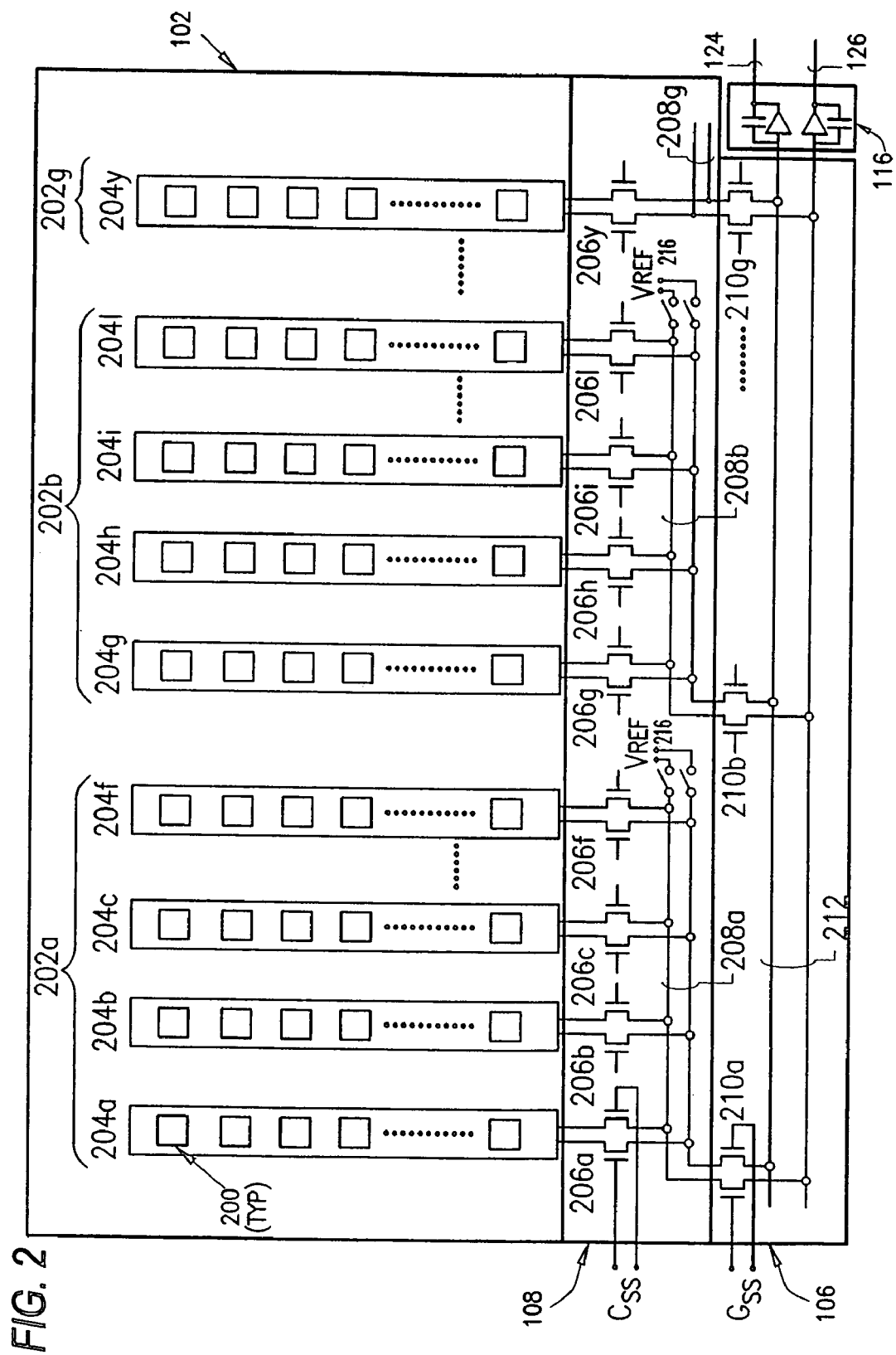
FIG. 2 is a schematic diagram.

As shown in FIG. 2, the array 102 includes subgroups 204a, 204b . . . 204y of active pixel sensors 200, that are organized into groups 202a, 202b . . . 202g. Each group 202a, 202b . . . 202g includes one or more subgroups 204a, 204b . . . 204y, for example, group 202a includes subgroups 204a, 204b . . . 204f. The subgroups 204a, 204b . . . 204y are arranged as columns. Alternatively, the subgroups 204a, 204b . . . 204y can be arranged as rows or in other configurations. In the illustrated implementation, each subgroup 204a, 204b . . . 204y includes two output ports, each of which is electrically coupled by two output lines to an associated subgroup select circuit 206a, 206b . . . 206y. Alternatively, each subgroup 204a, 204b . . . 204y may include only a single output port electrically coupled to an associated subgroup select circuit 206a, 206b . . . 206y through one or more electrically conductive lines.

The subgroup select circuits 206a, 206b . . . 206y are represented as NMOS switches, however, the subgroup select circuits 206a, 206b . . . 206y may include other circuitry such as, sample and hold circuitry, or other signal processing circuitry. Additionally, such circuits could be implemented using NMOS, PMOS or CMOS technologies.

Each subgroup select circuit 206a, 206b . . . 206y includes output ports that are electrically coupled to a differential output bus 208a, 208b . . . 208g. Each differential output bus 208a, 208b . . . 208g may include two or more conductive paths that electrically couple the output ports of all of the subgroup select circuits 206a, 206b . . . 206y associated with a particular group 202a, 202b . . . 202g to an input port of a respective group select circuit 210a, 210b . . . 210g. The group select circuits 210a, 210b . . . 210g can be implemented using NMOS switches, although, other implementations may include PMOS or CMOS switches. Each group select circuit 210a, 210b . . . 210g includes output ports that can be electrically coupled to a common output bus 212. This common output bus 212 can be electrically coupled, for example, to input ports of a readout circuit 116, such as a charge mode read-out amplifier or other signal processing circuit.

The differential output buses 208a, 208b . . . 208g are coupled to a set of clamping voltage switches 216. These switches close when the respective differential output bus 208a, 208b . . . 208g is electrically isolated from the read-out circuit 116, to maintain the bus voltage at a predetermined clamp voltage value. The clamp voltage can be, for example, the power supply voltage or a grounded connection. This can minimize signal distortion and undesirable leakage current in the system.

The controller 104 sends subgroup select signals $C_{ss}$ to the gate terminals of the subgroup select circuits 206a, 206b . . . 206y to enable each subgroup select circuit 206a, 206b . . . 206y to pass a signal from an active pixel sensor 200 of a respective subgroup 204a, 204b . . . 204y to a respective differential bus 208a, 208b . . . 208g. The controller 104 also sends group select signals $G_{ss}$ to the gate terminals of the group select circuits 210a, 210b . . . 210g to enable each group select circuit 210a, 210b . . . 210g to pass a signal from a respective subgroup select circuit 206a, 206b . . . 206y to the common output bus 212.

Figure 3:
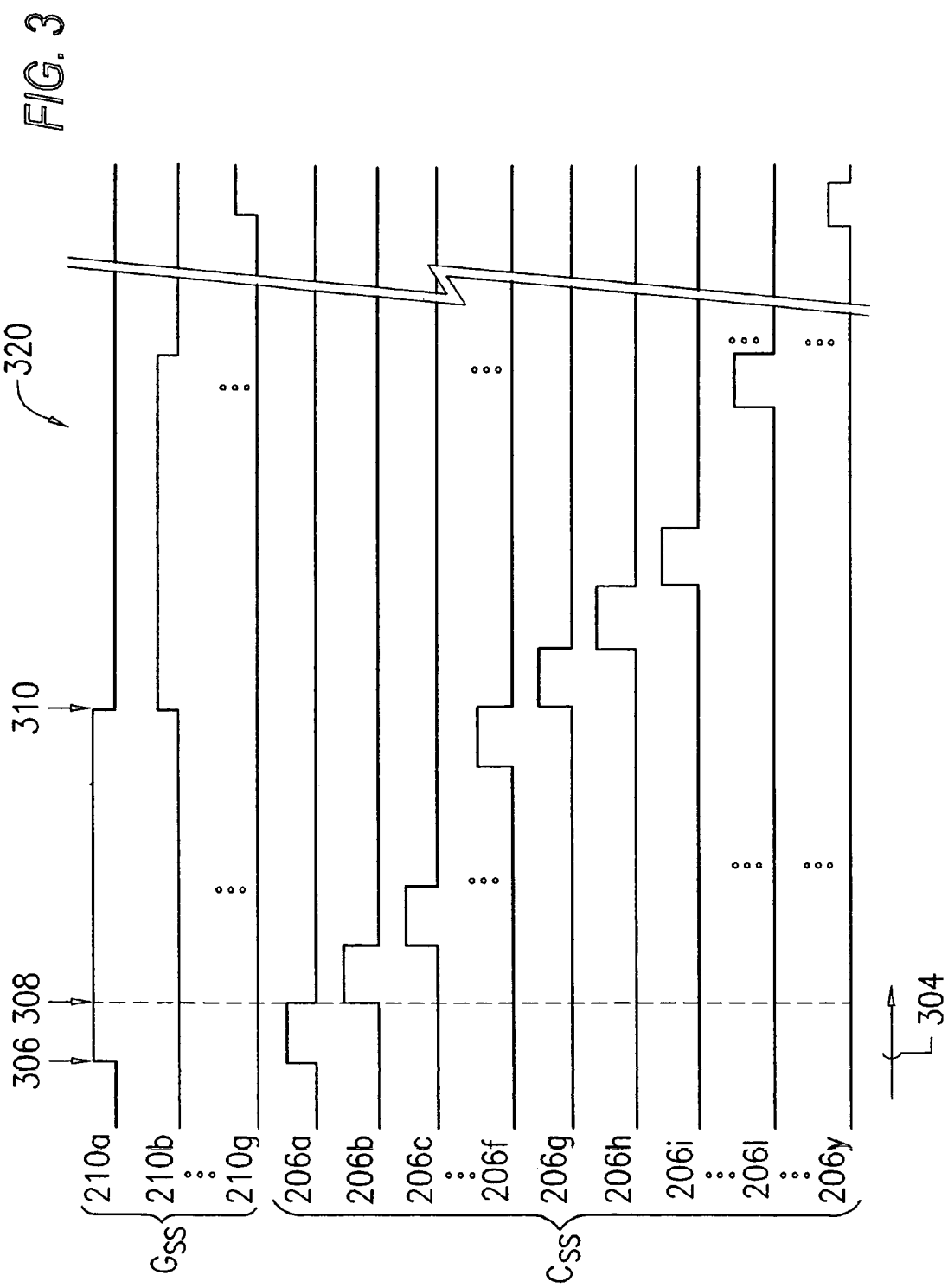
FIG. 3 is a timing diagram.

FIG. 3 is a control signal timing diagram 320 detailing the operation of readout circuit 116. Group select signals $G_{ss}$ for each respective group select circuit 210a, 210b . . . 210g and subgroup select signals $C_{ss}$ for each respective subgroup select circuit 206a, 206b . . . 206y are shown as a function of time along a time axis 304. The group select signals $G_{ss}$ and the subgroup select signals $C_{ss}$ can be, for example, voltage signals generated by the controller 104 or by another circuit or combination of circuits and power sources. The group select signals $G_{ss}$ are provided at gate terminals of each group select circuit 210a, 210b . . . 210g to selectively enable each group select circuits 210a, 210b . . . 210g to pass a signal between the respective drain and source terminals one at a time, in a sequential manner. The subgroup select signals $C_{ss}$ are provided to gate terminals of each subgroup select circuit 206a, 206b . . . 206y to selectively enable each subgroup select circuit 206a, 206b . . . 206y to pass a signal between the respective drain and source terminals one at a time, in a sequential manner.

At time 306, a group select signal $G_{ss}$ is applied to the gate terminal of group select circuit 210a establishing a conductive path between the drain and source terminals of group select circuit 210a, thereby effectively "closing" the switch. At the same time 306, a subgroup select signal $C_{ss}$ is applied to the gate terminals of subgroup select circuit 206a establishing a conductive path between the drain and source terminals of the subgroup select circuit 206a, thereby effectively "closing" the switch. Applying a subgroup select signal $C_{ss}$ to the gate terminals of subgroup select circuit 206a thus enables the subgroup select circuit 206a to pass a signal to the group select circuit 210a. Similarly, applying a group select signal $G_{ss}$ to the gate terminals of group select circuit 210a enables the group select circuit 210a to pass the signal to the common bus 212. During this time, the readout circuit 116 is isolated electrically from subgroup select circuits 206b . . . 206g that are associated with groups 202b . . . 202g.

Immediately following time 306, the charge mode read-out circuit 116 can receive a signal from an active pixel sensor 200 in subgroup 204a of group 202a. The signal is passed from subgroup 204a, to subgroup select circuit 206a, to differential output bus 208a, through group select circuit 210a, to common differential output bus 212, and then to readout circuit 116.

At time 308, the group select signal $G_{ss}$ previously applied to group select circuit 210a is maintained, but the subgroup select signal $C_{ss}$ previously applied to subgroup select circuit 206a is changed to disable subgroup select circuit 206a, effectively "opening" the switch. That has the effect of electrically isolating subgroup 204a from the readout circuit 116 and electrically coupling subgroup 204b to the readout circuit 116. A subgroup select signal $C_{ss}$ is then applied to enable subgroup select circuit 206b.

Immediately following time 308, a signal generated in a pixel of subgroup 204b can be passed from subgroup 204b, to subgroup select circuit 206b, to differential output bus 208a, through group select circuit 210a, to common differential output bus 212, and to readout circuit 116.

The subgroup select signals $C_{ss}$ sequentially enable, one at a time, the subgroup select circuits 206a, 206b . . . 206f that are coupled to the group select circuit 210a. During that time, a group select signal $G_{ss}$ is applied at the gate terminals of group select circuit 210a to maintain group select circuit 210a in a conductive state.

At time 310, the group select signal $G_{ss}$ that was previously applied to group select circuit 210a is removed and a new group select signal $G_{ss}$ is applied to group select circuit 210b. The subgroup select signals $C_{ss}$ then are sent, sequentially, to each subgroup select circuit 206g, 206h . . . 206l coupled to group select circuit 210b. While the group select circuit 210b is in a conductive state, the readout circuit 116 is isolated electrically from the subgroup select circuits not associated with group 202b.

The read-out circuit 116 continues in this manner to read-out signals sequentially from the subgroup select circuits 206a, 206b . . . 206y until they all have been read and passed to readout circuit 116. The particular order of polling may vary.

Figure 4:
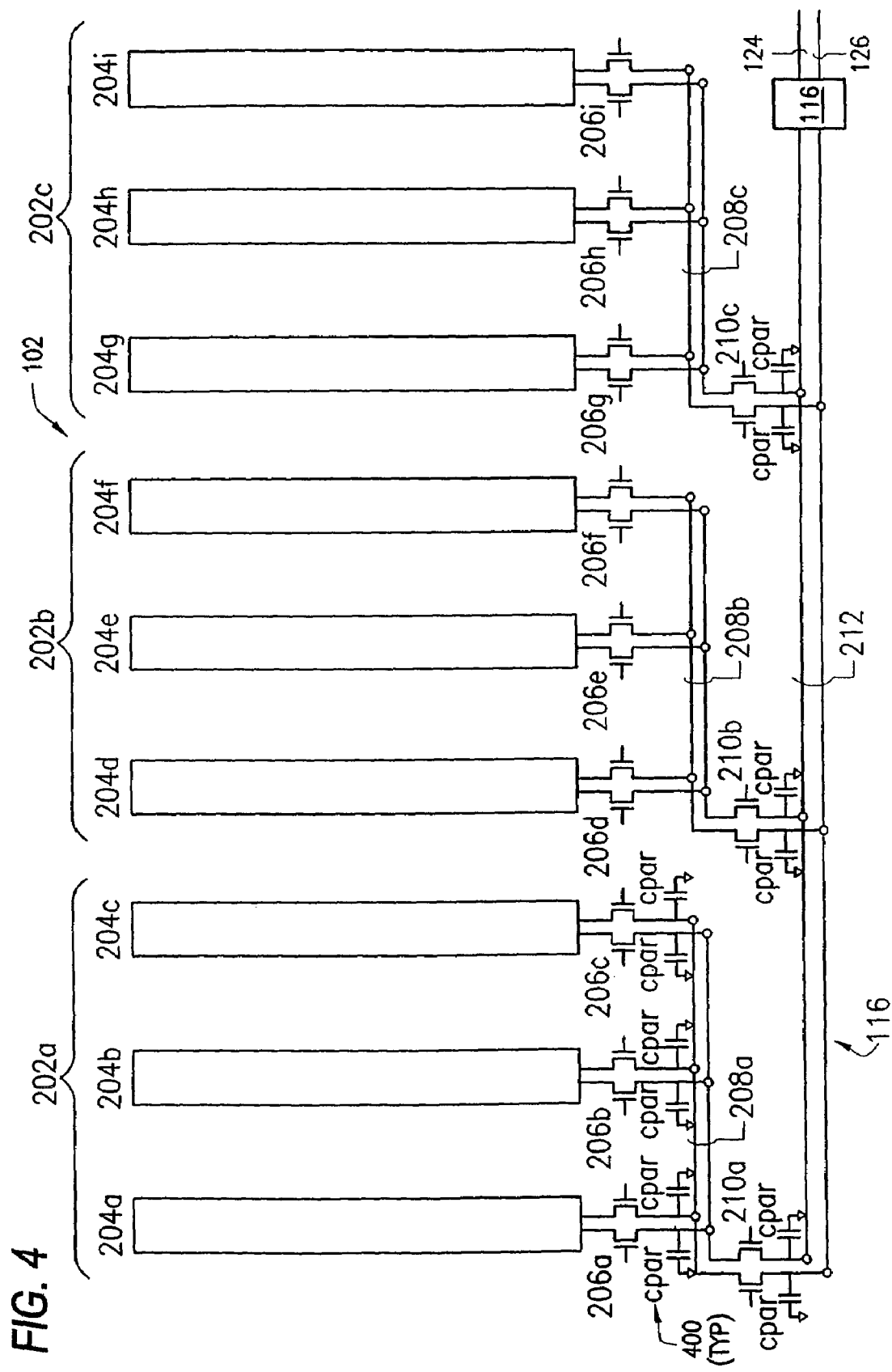
FIG. 4 is a schematic diagram.

FIG. 4 illustrates how the techniques described herein can reduce parasitic capacitance present at the input terminals of an imagery's readout circuit 116. An array 102 includes nine subgroups 204a, 204b . . . 204i of active pixel sensors 200. The subgroups 204a, 204b . . . 204i are divided into three groups 202a, 202b, and 202c. Each group 202a, 202b, and 202c includes three subgroups. For example, group 202a includes subgroups 204a, 204b, and 204c. Each subgroup 204a, 204b . . . 204i includes two output ports electrically coupled to a subgroup select circuit 206a, 206b . . . 206i, each subgroup select circuit 206a, 206b . . . 206i includes two output ports coupled electrically to a group select circuit 210a, 210b and 210c associated with a particular group 202a, 202b, or 202c. Each group select circuit 210a, 210b and 210c includes two output ports coupled electrically to a common differential output bus 212 which terminates at a readout circuit 116.

The readout circuit 116 can amplify a signal it receives to facilitate further processing of the signal downstream of the readout circuit 116. The readout circuit 116 can require a considerable amount of power to accomplish these functions. The foregoing techniques can be used to help reduce the power requirements of the readout circuit 116.

Subgroup select circuits 206a, 206b . . . 206i and group select circuits 210a, 210b, 210c have associated values of parasitic capacitance values $C_{par}$ that are approximately the same for each circuit. Also, the approximate value of parasitic capacitance for a given switch does not change significantly whether the switch is in a conductive or a non-conductive state.

Assuming that group select circuit 210a is in a conductive state and group select circuits 210b and 210c are in a non-conductive state, the total parasitic capacitance that can be seen at the input terminals of the readout circuit 116 is approximately equal to the sum of the parasitic capacitances of circuits 206a, 206b, 206c, 210a, 210b, and 210c, or six times $C_{par}$. If group select circuits were not included in the implementation illustrated in FIG. 4, the parasitic capacitance would be approximately equal to the sum of the parasitic capacitances of circuits 206a, 206 . . . 206i, or nine times $C_{par}$. Therefore, integration of group select circuits 210a, 210b and 210c can provide a reduction in the parasitic capacitance from nine times $C_{par}$ to six times $C_{par}$ at the input terminals of the readout circuit 116. With such a reduction of parasitic capacitance, a corresponding reduction in capacitive current losses also can be realized. Accordingly, the power required by the readout circuit 116 can be reduced as well.

As illustrated in the above example, the optimum number of group select circuits 210a, 210b, 210c to minimize parasitic capacitance $C_{par}$ should be approximately equal to the square root of the number of subgroup select circuits 206a, 206b . . . 206i in the system. For example, if there are nine subgroup select circuits 206a, 206b . . . 206i, then three group select circuits 210a, 210b and 210c should be used. If additional levels of selection circuits are added downstream from the group select circuits 210a, 210b, 210c, a similar design guideline may be applied. For each particular level of selection circuitry, the number of selection circuits to be implemented for reducing parasitic capacitance can be optimized.

To do so, the number of selection circuits should be approximately equal to the square root of the number of selection circuits present in. the layer immediately upstream from it.

Some array designs include 100 subgroups, 280 subgroups, 480 subgroups or 900 subgroups. Each subgroup would have a corresponding subgroup select circuit. Based on the foregoing guideline for optimizing the number of group select circuits, the 100 subgroup select circuits would be coupled to approximately 10 group select circuits, the 280 subgroup select circuits would be coupled to approximately 17 group select circuits, the 480 subgroup select circuits would be coupled to approximately 22 group select circuits and the 900 subgroup select circuits would be coupled to approximately 30 group select circuits. In these examples, the ratio of subgroup select circuits to group select circuits ranges from approximately 10:1 to 40:1 and preferably from approximately 15:1 to 30:1.

Figure 5:
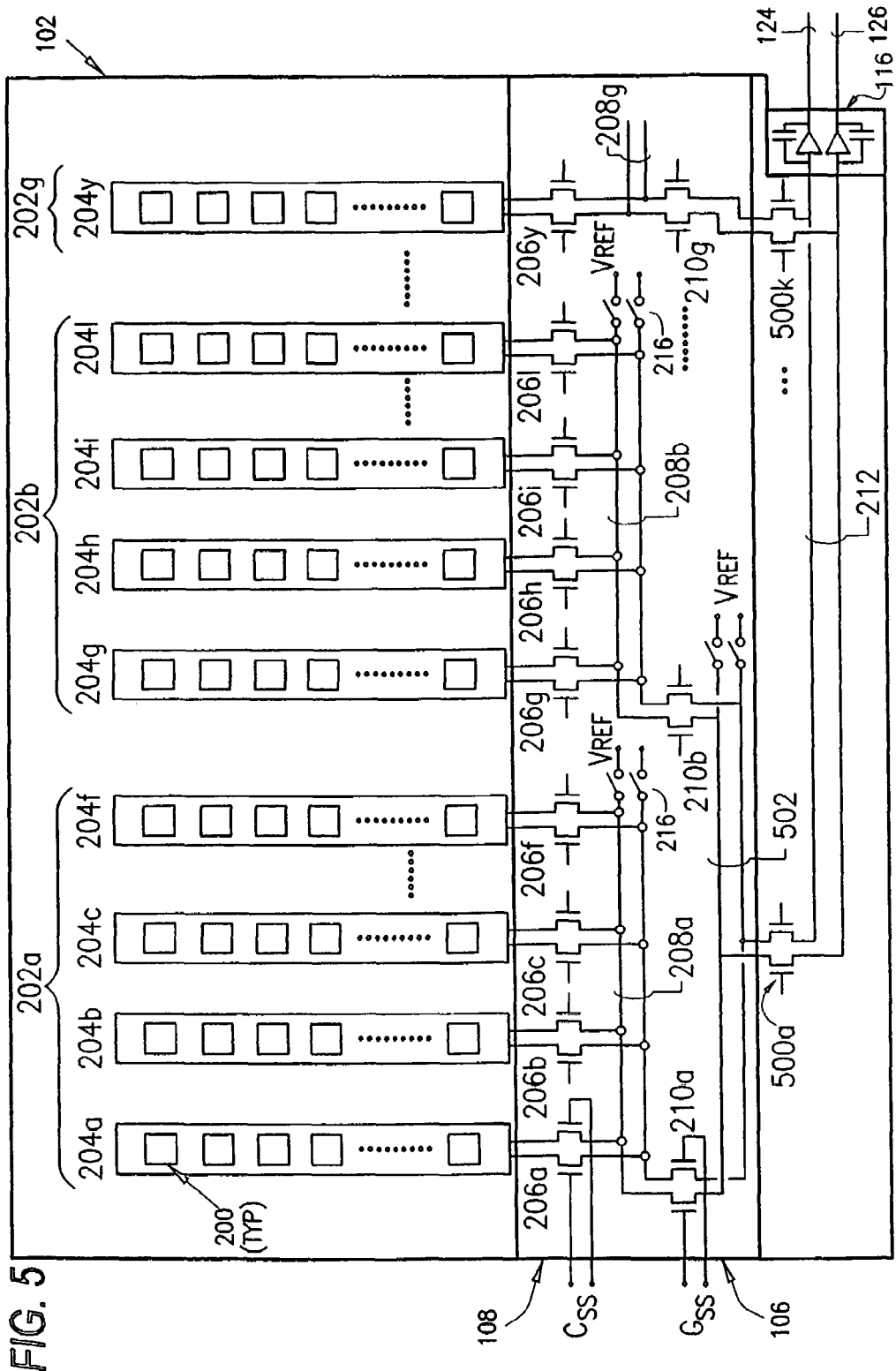
FIG. 5 is a schematic diagram.

As shown in FIG. 5, the techniques can be applied to multiple levels of selection circuitry, implemented, for example, as a set of supergroup select circuits 500a . . . 500k. Each supergroup select circuit 500a . . . 500k is coupled to receive output signals from a set of group select circuits 210a, 210b . . . 210y associated with a supergroup select circuit 500a . . . 500k. A supergroup can be considered to be a group of groups. The controller 104 can provide control signals at the gate terminals of each supergroup select circuit 500a . . . 500k to selectively enable each supergroup select circuits 500a . . . 500k to pass a signal, for example, from a supergroup input bus 502 to a common output bus 212. Each supergroup select circuit 500a . . . 500k can be implemented using a transistor switch with a respective gate terminal for receiving the control signal from the controller 104. The control signals can selectively enable each supergroup select circuit 500a . . . 500k in cooperation with the group select circuits 210a, 210b . . . 210g and the subgroup select circuits 206a, 206b . . . 206y to allow passage of signals from each subgroup select circuit 206a, 206b . . . 206y to the readout circuit 116, one at a time, sequentially, similarly as outlined in detail above.

Various modifications to the foregoing techniques are possible. Other signal conditioning or signal sampling circuitry may be included according to the particular system requirements of each application. Additionally, the sequence of switching for the group select circuits 210a, 210b . . . 210g and the subgroup select circuits 206a, 206b . . . 206y may be varied so that the readout circuit 116 receives signals from different areas of the array 102 in a different order than the order described herein.

Other implementations are within the scope of the following claims.

What is claimed is:

1. An integrated circuit comprising:
a plurality of first sets of pixels, each first set comprising a plurality of subsets of pixels;
a plurality of first circuits each coupled to an output from a respective subset;
a plurality of second circuits, each of which is coupled to outputs from the first circuits associated with a respective one of the first sets;
a first bus for each first set coupled to the outputs of the associated first circuits, each first circuit configured to selectively connect the respective subset to a respective first bus;
a second bus for receiving signals from each of the sets, each second circuit configured to selectively connect the respective set to the respective second bus;

a readout circuit for receiving signals from the first and second buses; and
   a third circuit coupled to each first bus for selectively isolating each first set from the readout circuit, the third circuit comprising a first switch for selectively connecting the first bus to a predetermined voltage.

2. The integrated circuit of claim 1 further comprising a controller for providing control signals to the first circuits and the second circuits to selectively enable the respective first circuits and second circuits to pass signals in a charge mode manner from the pixels to the readout circuit.

3. The integrated circuit of claim 1 further comprising a second bus coupled to the outputs of the second circuits and the readout circuit.

4. The integrated circuit of claim 1 wherein the number of second circuits is approximately equal to the square root of the number of first circuits.

5. The integrated circuit of claim 1 wherein a ratio of the number of first circuits to second circuits is in a range of 10:1 and 40:1.

6. The integrated circuit of claim 1 wherein each first circuit comprises a transistor switch with a respective gate terminal for receiving a control signal from the controller, wherein when the transistor switch is turned on, the second circuit is enabled to pass signals from associated first circuits to the first bus.

7. The integrated circuit of claim 6 wherein each first circuit comprises a transistor switch with a respective gate terminal for receiving a control signal from the controller, wherein when the first circuit transistor switch is turned on, the first circuit is enabled to pass signals from an associated subset of pixels.

8. The integrated circuit of claim 1 wherein each second circuit comprises a pair of NMOS transistor switches.

9. The integrated circuit of claim 1 further comprising:
a plurality of second sets of pixels, each second set comprising at least two first sets;
fourth circuits, each of which is coupled to outputs from second circuits associated with a respective one of the second sets, each fourth circuit configured to selectively connect the respective second set to a third bus, the third bus connected to the readout circuit; and
a fifth circuit coupled to each second bus for selectively isolating each second set from the readout circuit, the fifth circuit comprising a second switch for selectively connecting the second bus to a predetermined voltage.

10. The integrated circuit of claim 9 wherein the controller is configured to provide control signals to the fourth circuits to selectively enable the fourth circuits to pass a signal from the second bus to the third bus.

11. The integrated circuit of claim 9 wherein each fourth circuit comprises a transistor switch with a respective gate terminal for receiving a control signal from the controller.

12. An image sensor comprising:
an array of pixels arranged in columns and rows, the array comprising:
a plurality of first sets of pixels, each first set comprising a plurality of subsets of pixels, each subset comprising at least one column of pixels;
a plurality of first circuits each coupled to an output from a respective subset;
a plurality of second circuits, each of which is coupled to outputs from the first circuits associated with a respective one of the first sets;
a first bus for each first set coupled to the outputs of the associated first circuits, each first circuit configured to selectively connect the respective subset to a respective first bus;
a second bus for receiving signals from each of the sets, each second circuit configured to selectively connect the respective set to the respective second bus;
a readout circuit for receiving signals from the first and second buses; and
a third circuit coupled to each first bus for selectively isolating each first set from the readout circuit, the third circuit comprising a first switch for selectively connecting the first bus to a predetermined voltage.

13. The image sensor of claim 12, further comprising:
a plurality of second sets of pixels, each second set comprising at least two first sets;
fourth circuits, each of which is coupled to outputs from second circuits associated with a respective one of the second sets, each fourth circuit configured to selectively connect the respective second set to a third bus, the third bus connected to the readout circuit; and
a fifth circuit coupled to each second bus for selectively isolating each second set from the readout circuit, the fifth circuit comprising a second switch for selectively connecting the second bus to a predetermined voltage.

14. The image sensor of claim 13, wherein the predetermined voltage is one of a supply voltage for the apparatus or a ground potential.

15. An image sensor comprising:
an array of pixels arranged in columns and rows, the pixels of a column having commonly connected outputs;
a plurality of first selector circuits each respectfully associated with a column of pixels, the first selector circuits being arranged into a plurality of first groups of first selector circuits and each first selector circuit of a first group being selectively operable to connect a respective column of pixels to a first bus;
a plurality of second selector circuits each associated with a first bus for selectively connecting an associated first bus to a second bus;
a readout circuit for reading out pixel signals from the first and second buses; and
an isolation circuit for selectively connecting at least one first bus to a predetermined voltage.

16. The image sensor of claim 15, wherein the second selector circuits are arranged into a plurality of second groups of second selector circuits and each second selector circuit of a second group being selectively operable to connect an associated first bus to a respective second bus; and further comprising a plurality of third selector circuits each associated with a second bus for selectively connecting an associated second bus to a third bus.

17. The image sensor of claim 15, further comprising an isolation circuit for selectively connecting at least one second bus to a predetermined voltage.

18. The image sensor of claim 16, further comprising an isolation circuit for selectively connecting the third bus to a predetermined voltage.

19. The image sensor of claim 16, wherein the readout circuit is coupled to the third bus.

20. A method of obtaining a readout of a pixel sensor array comprising:
providing an array of pixels, the array comprising a plurality of sets of pixels, each set comprising a plurality of subsets of pixels;
selectively enabling a first circuit and a second circuit to allow a signal from each pixel in a subset to pass sequentially and in a charge mode manner to a readout circuit electrically connected to said first circuit, the first circuit connected to an output of each subset, the second circuit connected to an output of each set;

sensing a charge at the readout circuit; and selectively isolating from the readout circuit the subsets and sets not associated with the selectively enabled first circuit by disabling the second circuits and first circuits not associated with the selectively enabled first circuit and applying a predetermined voltage to at least one first bus coupled to the disabled first circuits by operating a switch coupled to the at least one first bus.

21. The method of claim 20, wherein the pixels are further organized in columns and rows and wherein each subset comprises at least one column.

22. The method of claim 20, wherein the predetermined voltage is one of a supply voltage for the array or a ground potential.

* * * * *

UNITED STATES PATENT AND TRADEMARK OFFICE
CERTIFICATE OF CORRECTION

PATENT NO. : 7,649,558 B2 Page 1 of 1
APPLICATION NO. : 11/455714
DATED : January 19, 2010
INVENTOR(S) : Rossi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 775 days.

Signed and Sealed this

Twenty-third Day of November, 2010

David J. Kappos
*Director of the United States Patent and Trademark Office*